(12) United States Patent
Collins et al.

(10) Patent No.: US 10,033,803 B1
(45) Date of Patent: Jul. 24, 2018

(54) DATA VOLUME AUTO-REPAIR BASED ON VOLUME DEGRADATION LEVEL

(71) Applicant: Amazon Technologies, Inc., Seattle, WA (US)

(72) Inventors: Jonathan Robert Collins, Seattle, WA (US); Divya Malika Patruni, Seattle, WA (US); Neha Sherpa, Seattle, WA (US); Bogdan Munteanu, San Mateo, CA (US)

(73) Assignee: Amazon Technologies, Inc., Seattle, WA (US)

( * ) Notice: Subject to any disclaimer, the term of this patent is extended or adjusted under 35 U.S.C. 154(b) by 494 days.

(21) Appl. No.: 14/530,355

(22) Filed: Oct. 31, 2014

(51) Int. Cl.
*H04L 29/08* (2006.01)
*G06F 9/50* (2006.01)
*G06F 9/455* (2018.01)

(52) U.S. Cl.
CPC ...... *H04L 67/1008* (2013.01); *G06F 9/45558* (2013.01); *G06F 9/5027* (2013.01); *G06F 2009/45587* (2013.01)

(58) Field of Classification Search
None
See application file for complete search history.

(56) References Cited

U.S. PATENT DOCUMENTS

| | | | | |
|---|---|---|---|---|
| 5,581,690 A * | 12/1996 | Ellis | ................... | G06F 11/1076 714/6.22 |
| 7,096,381 B2 * | 8/2006 | Largman | ............. | G06F 11/1417 714/13 |
| 2007/0159897 A1 * | 7/2007 | Wang | .................. | G06F 11/1435 365/200 |
| 2007/0260830 A1 * | 11/2007 | Faibish | ................... | G06F 3/061 711/162 |
| 2010/0318837 A1 * | 12/2010 | Murphy | .............. | G06F 11/1461 714/4.1 |
| 2011/0246652 A1 * | 10/2011 | Tabbara | ................. | G06Q 30/06 709/226 |
| 2012/0072689 A1 * | 3/2012 | Kempen | ........... | G06F 17/30215 711/162 |
| 2012/0137066 A1 * | 5/2012 | Nolterieke | .............. | G06F 3/061 711/114 |
| 2015/0227602 A1 * | 8/2015 | Ramu | ............... | G06F 17/30575 707/634 |

* cited by examiner

*Primary Examiner* — Thomas J Dailey
(74) *Attorney, Agent, or Firm* — Klarquist Sparkman, LLP

(57) ABSTRACT

A method for performing auto-repair of a data volume may include determining a number of unavailable shards from a plurality of shards associated with a data volume. The plurality of shards may be stored in a plurality of data centers. The data volume may be erasure-coded with a total of N shards and can be reconstructed using at least K available shards out of the N shards. The unavailable shards may be filtered to exclude shards that have been unavailable for less than a threshold amount of time. For each of the plurality of data centers, a total number of unavailable shards may be determined if the data center is disabled. The total number of unavailable shards may be based at least in part on a number of shards associated with the data volume and stored at the data center, and a number of the filtered unavailable shards stored at the remaining plurality of data centers.

18 Claims, 10 Drawing Sheets

| LEVEL NAME | VOLUME DEGRADATION LEVEL | THRESHOLD PERIOD |
| --- | --- | --- |
| LEVEL 1 | DATA CENTER IS LOST | 1 HOUR |
| LEVEL 2 | (N-K) OR (N-K-1) UNAVAILABLE | 1 HOUR |
| LEVEL 3 | (N-K-2) UNAVAILABLE | 1 HOUR |
| LEVEL 4 | > (N − DataWriteMin) UNAVAILABLE | 3 DAYS |
| LEVEL 5 | = (N − DataWriteMin) UNAVAILABLE | 5 DAYS |
| LEVEL 6 | >= 1 UNAVAILABLE | 7 DAYS |
| LEVEL 7 | > (N-K) UNAVAILABLE | NO ACTION |
| LEVEL 8 | 0 UNAVAILABLE | NO ACTION |

DATA VOLUME AUTO-REPAIR BASED ON VOLUME DEGRADATION LEVEL

BACKGROUND

Cloud computing is the use of computing resources (hardware and software) that are available in a remote location and accessible over a network, such as the Internet. In a computing environment with many computing devices, such as a virtual server or cloud computing environment with many server computers, the use of computing resources can provide a number of advantages including cost advantages and/or the ability to adapt rapidly to changing computing resource needs.

With the increased use of cloud computing, some cloud computing environments may require frequent maintenance of resources that have become unavailable. Additionally, manual monitoring and maintenance of such resources may be inefficient and time-consuming.

BRIEF DESCRIPTION OF THE DRAWINGS

Various embodiments in accordance with the present disclosure will be described with reference to the drawings, in which:

FIG. 2 is a table of example volume degradation levels and corresponding threshold times used by the environment of FIG. 1, in accordance with an embodiment of the disclosure.

DETAILED DESCRIPTION

Figure 1:
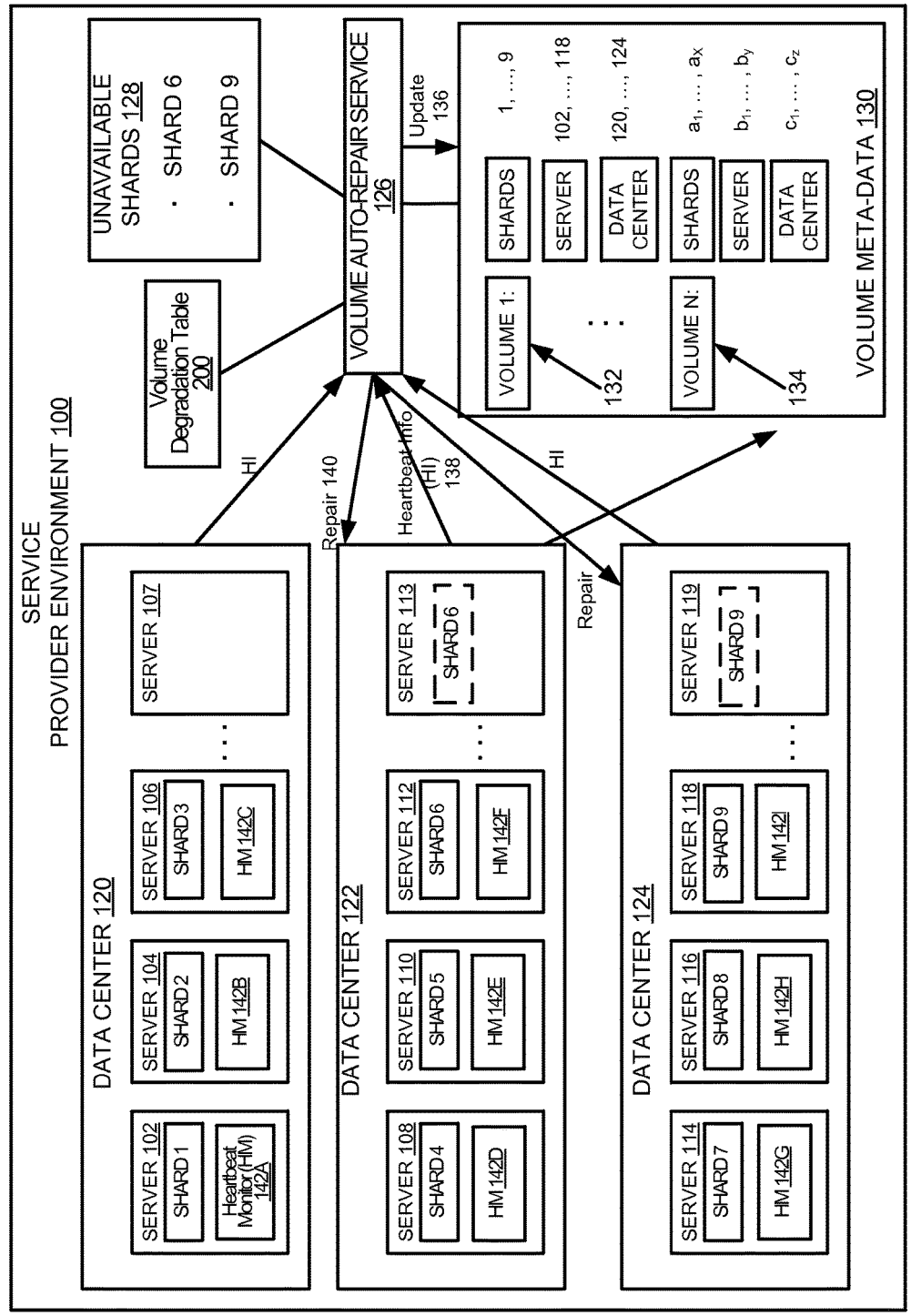
FIG. 1 is a diagram of an example service provider environment supporting data volume auto-repair based on degradation level, in accordance with an embodiment of the disclosure.

By way of introduction, volumes are logical containers to store data. Each volume has N independent shards present on different hosts and spread across different data centers. To reconstruct data from a volume, at least 'K' shards should be available, but for a variety of reasons, shards could become unavailable. As available shards reduce from 'N' towards 'K', the data in the volume becomes less trustworthy. Once the volume is less than 'K', data in the volume is irretrievably lost. A systematic approach is defined herein for making decisions about when to trigger an auto repair of a data volume based on a volume degradation level. The systematic approach can be anticipatory before a volume is actually lost by grouping shards that are geographically or electronically associated together, such that if they fail as a group, then the volume would be lost. In one example, shards can be geographically associated through a data center, and the system can analyze if (hypothetically) the data center fails, would the volume be recoverable. In another example, the shards can be electronically grouped based on a common electronic component, such as a switch in a rack, and if the common electronic component fails, would the volume be recoverable. Other examples of geographic or electronic association can be used.

A virtual machine image contains an operating system (e.g., Linux) and other data needed to launch a virtual machine in a virtual environment. The virtual machine image is similar to a physical computer's disk volume, and may include a file system, the operating system and other components needed to boot up as a machine. In order to launch a virtual machine, hardware needs to be selected. The hardware selection may be accomplished through instance types, which may allow a variety of different sizes of memory, CPU capacity, I/O performance, and so forth. The combination of the virtual machine image and the instance type can be used to create an "instance" or a virtual machine, which may be launched on a cloud computing resource, such as a host server computer in a multi-tenant network environment.

As used herein, the terms "instance", "virtual machine" and "virtual machine instance" (or VMI) are interchangeable.

As used herein, the term "resources" refers to hardware resources associated with a server computer running one or more virtual machine instances (e.g., CPU, memory, disk storage or other type of storage, network card, and so forth) and/or software resources (e.g., one or more applications and/or operating system running on the virtual machine). The term "resources" (e.g., VMI resources) may refer to a specific configuration of a VMI (e.g., as offered for rent to a customer of a service provider). The term "resource state" may refer to state information associated with one or more resources of a virtual machine (and/or a server) at a given point in time, which state information may be stored for subsequent use (e.g., in network storage or in a local storage attached to a server computer and associated with an instance).

As used herein, the term "blob" stands for "binary large object." A blob, as used herein, is a sequence of bytes that are reliably stored. As used herein, the term "volume" (or "data volume") is a collection of blobs (or data), and is a unit of virtual storage that is spread across two or more storage nodes (e.g., hosts or server computers). A volume may be erasure-encoded and may be composed of N shards (or volumelets). As used herein, the term "shard" (or "volumelet") is a portion of a volume. A shard (or volumelet) is a contiguous block of storage on a disk, and may contain thousands or millions of data objects. Each shard (or volumelet) for a volume may have the same blobs and may reside on a single disk on a storage node (or host), with each shard (or volumelet) residing on a separate host. The N shards for each volume may reside in two or more data centers. Additionally, a minimum of K out of the N shards may be used to reconstruct data in a volume. As used herein, the term "DataWriteMin" is a parameter that designates a minimum number of shards to be available for successful data writing into a volume. Therefore, a volume may allow for (N−K) unavailable shards (or volumelets) without data loss or unavailable objects.

The following description is directed to techniques and solutions supporting data volume auto-repair based on volume degradation level. For a given data volume that includes N shards stored in N separate hosts, shard availability may be monitored by each host and unavailable shards may be detected. Upon detecting that a shard is unavailable for at least a predetermined minimum period of time, the shard may be considered permanently unavailable and a candidate for repair. The predetermined minimum period of time may be used in order to rule out (and not consider as unavailable) transient shard failures (e.g., a shard becomes unavailable but after a short period of time (less than the predetermined minimum period of time) the shard again becomes available). The data volume is characterized by parameters N, K, and DataWriteMin, as explained above. As shards within the volume are monitored for unavailability, a volume degradation level may be determined based on the number of unavailable shards (excluding any transient failures), N, K, and/or DataWriteMin. In this regard, the volume degradation level may be selected from a plurality of available (and predefined) degradation levels, each associated with a predefined number of shards that have been unavailable for a threshold time period. Automatic repair of unavailable shards may be initiated based on, for example, unavailability duration (e.g., the time period a shard has been unavailable), a percentage of the total number of shards N that is unavailable (e.g., a volume will be unrecoverable if a certain percent/number of shards become unavailable), and/or data center unavailability (e.g., a volume will be unrecoverable if one of the data centers that stores a portion of its shards becomes unavailable). During a volume repair, the missing/unavailable shards may be recovered (generated) from the remaining shards in the volume (assuming at least K of the N shards are still available), and the recovered shard may be stored at a new host server computer. Corresponding metadata associated with the volume may be updated to reflect the new shard location (e.g., IP address of the new host storing the recovered shard).

Figure 4:
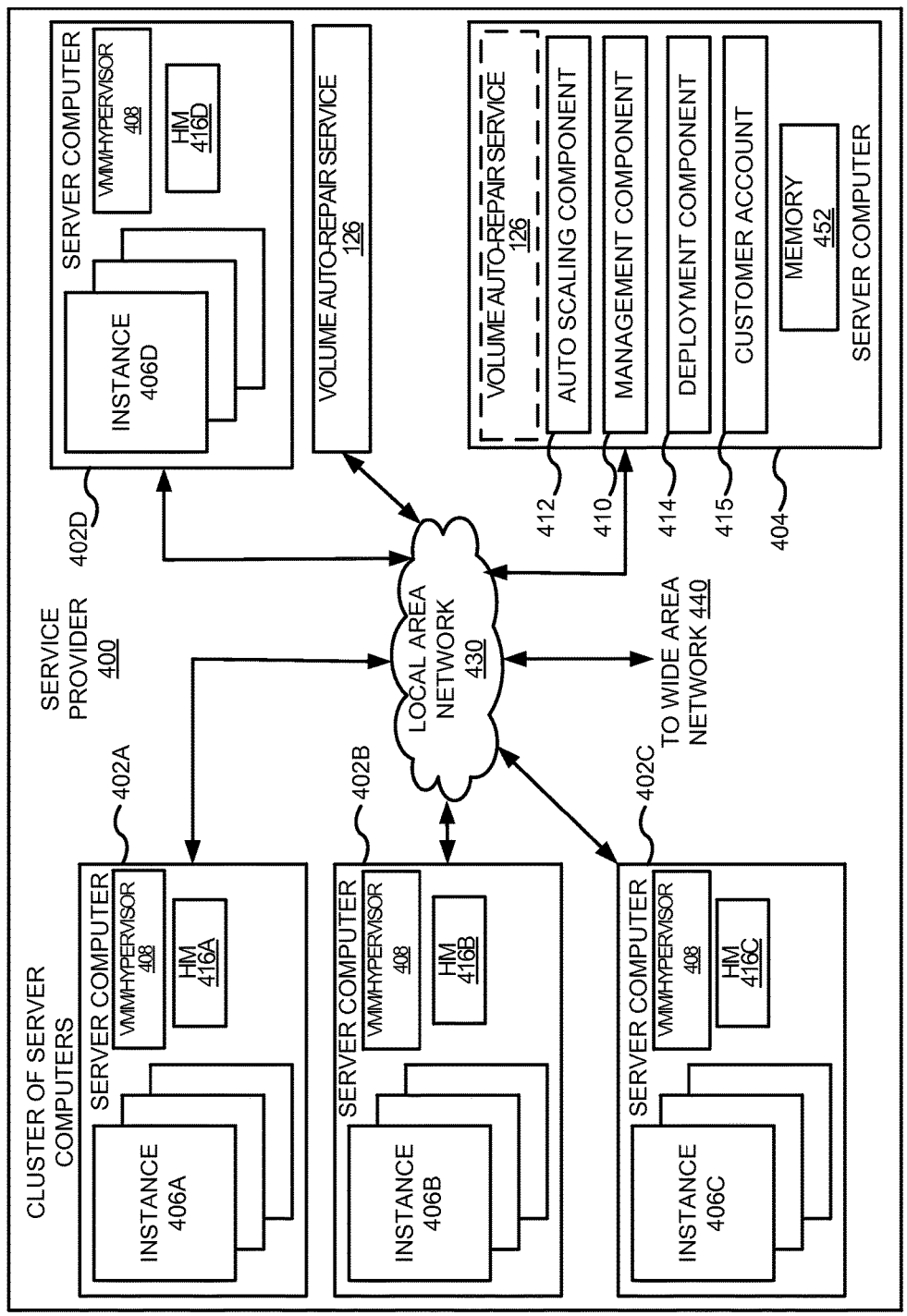
FIG. 4 is an example system diagram showing a plurality of virtual machine instances running in a multi-tenant environment, using a volume auto-repair service, in accordance with an example embodiment of the disclosure.

FIG. 1 is a diagram of an example service provider environment supporting data volume auto-repair based on degradation level, in accordance with an embodiment of the disclosure. Referring to FIG. 1, the example service provider environment (or service provider) 100 may comprise a plurality of server computers, such as 102-119 and a volume auto-repair service (VARS) 126. The service provider environment 100 may be a multi-tenant cloud network environment where one or more clients may run one or more virtual machine instances (VMIs) (e.g., VMIs 406 as seen in FIG. 4) on one or more of the server computers (e.g., VMIs 406 running on server computers 402). The server computers (or servers) 102, . . . , 119 may be associated with a plurality of data centers 120-124, so that servers 102-107 are located within data center 120, servers 108-113 are located in data center 122, and servers 114-119 are located in data center 124. The plurality of server computers 102-106, 108-112, and 114-118 may be used to store shards of one or more data volumes. Even though only nine shards are illustrated in FIG. 1 (e.g., for volume 132) stored in three data centers, the present disclosure may not be limited in this regard and any number of shards per volume may be used, stored in any number of data centers.

For example, a data volume (or volume) 1 may include 9 shards (shards 1, . . . , shard 9), with shards 1-3, 4-6, and 7-9 being stored at corresponding servers 102-106, 108-112, and 114-118, respectively (one shard being stored at each server, as seen in FIG. 1). For the specific example illustrated in FIG. 1, data volume 1 may have 9 shards (i.e., N=9) with at least 5 shards required to restore any unavailable shards and repair the data volume (i.e., K=5). Other volume sizes can be used. The shards may be stored at a local data volume attached to each server (e.g., a physical storage device attached to the server, such as an internal or external hard drive) (not illustrated in FIG. 1). A virtual representation of the physical storage device may be represented to one or more VMIs running on the server computers. The shards can be geographically or electronically linked as a group, such that the entire group can fail simultaneously. For example, all shards in one datacenter can be geographically linked, while all shards that pass data through a same network component can be electronically linked.

Each of the servers 102-106, 108-112, and 114-118 may comprise a "heartrate" monitor (HM) 142 (e.g., 142A-142I). The HMs 142 may each comprise suitable logic, circuitry, interfaces, and/or code and may be operable to monitor the "health" (or operation) of a local server the HM is running on, as well as one or more applications running on the server or data, such as shards, stored on the server. Additionally, an HM running on a first server may also monitor one or more other servers, for which the first server is communicatively coupled. For example, the HM 142A may monitor operation of server 102 (as well as any other application running on server 102 and status/availability of shard 1 stored at server 102), as well as operation of servers 104-107 that are communicatively coupled to server 102 as part of data center 120. Any shard unavailability detected by an HM may be reported in "heartbeat" information (HI) 138 to the VARS 126.

The volume auto-repair service (VARS) 126 within the service provider 100 may comprise suitable logic, circuitry, interfaces, and/or code and may be operable to coordinate and/or perform volume auto-repair functions. More specifically, the VARS 126 may obtain "heartbeat" information (HI) 138 from the HMs 1142A-142I and may generate a list 128 of unavailable shards, using the volume degradation table 200 (illustrated in greater detail in FIG. 2). The VARS 126 may also use the volume metadata 130 to acquire shard information, server information and data center information associated with one or more data volumes (e.g., volumes 1, . . . , N). The volume metadata may be, for example, a look-up table (LUT) which may include shard identification information (e.g., shard number), server identification (e.g., IP address) of the servers storing the corresponding shards (one shard per server), and data center information for each data center associated with the servers. Even though the unavailable shards list 128, the volume degradation table 200 and the volume metadata 130 are illustrated as separate blocks, the invention may not be limited in this regard and one or more of the blocks 128, 130, and 200 may be implemented as part of the VARS 126, which itself may be executed on one or more host server computers. In some instances, the VARS 126 may incorporate other sub-services for performing various volume auto-repair functionalities (e.g., VARS 126 may incorporate a Repair Service, which may be used to generate the volume/shard repair instructions 140).

FIG. 2 is a table of example volume degradation levels and corresponding threshold times used by the environment of FIG. 1, in accordance with an embodiment of the disclosure. The thresholds are used to make decisions for triggering auto repair of a volume based on a volume degradation level. The threshold periods represent how long a shard should be observed as unavailable to be eligible for auto repair at a given volume degradation level.

The table 200 may identify a level name (first table column), a volume degradation level (second column), and a threshold period (third column). The table 200 lists eight levels (level 1-level 8) of degradation levels based on the number of unavailable shards for a volume, the total number of shards (N) for the volume, the minimum number of shards (K) that are necessary to reconstruct/repair the volume, as well as the DataWriteMin parameter for the volume (i.e., a minimum number of shards that need to be available for successful data writing into the volume). In connection with determining a degradation level, only shards that have been unavailable for at least the threshold period (third column) can be considered as unavailable shards and can be used for determining volume degradation. Shards that have been unavailable for less than the threshold period can be considered transiently unavailable (i.e., it may be assumed the shard will recover soon).

For degradation level 1, it can be determined whether any of the volume shards have been unavailable for at least 1 hour. Additionally, for each of the data centers storing the volume's shards, it may be determined whether at least K shards remain available, assuming the data center is down. For example and in reference to FIG. 1, volume 132 may have shards 6 and 9 unavailable (i.e., 2 of the 9 shards for the volume are unavailable). However, assuming data center 120 goes down, shards 1-3 will also become unavailable, bringing the total number of unavailable shards to 5 (and available shards to 4). Since K=5, the volume will be unrecoverable using the available 4 shards. In this case, the degradation level may be set to level 1 and the unavailable shards may be placed in the unavailable shards list 128 for repair.

For degradation levels 2 and 3, it can be determined whether any of the volume shards have been unavailable for at least 1 hour. The degradation level may be set to level 2 if (N−K) or (N−K−1) shards are unavailable, or level 3 if (N−K−2) shards are unavailable. Unavailable shards associated with degradation levels 2 and 3 may be placed in the unavailable shards list 128 for repair.

For degradation level 4, it can be determined whether any of the volume shards have been unavailable for at least 3 days. The degradation level may be set to level 4 if the number of unavailable shards is greater than (N-DataWriteMin). In this case, successful data writing to the volume may not take place and the unavailable shards have to be repaired. Consequently, unavailable shards associated with degradation level 4 may be placed in the unavailable shards list 128 for repair.

For degradation level 5, it can be determined whether any of the volume shards have been unavailable for at least 5 days. The degradation level may be set to level 5 if the number of unavailable shards is equal to (N-DataWriteMin). In this case, successful data writing to the volume may not take place if one more shards becomes unavailable. Unavailable shards associated with degradation level 5 may be placed in the unavailable shards list 128 for repair.

For degradation level 6, it can be determined whether any of the volume shards have been unavailable for at least 7 days. The degradation level may be set to level 6 if the number of unavailable shards is more than or equal to one. Unavailable shards associated with degradation level 6 may be placed in the unavailable shards list 128 for repair.

Degradation level 7 may be established if more than (N−K) shards are unavailable for a volume. No action may be taken in this case since the volume is unrepairable (i.e., less than K shards are available).

Degradation level 8 may be established if no shards are unavailable (i.e., there is no volume degradation) and, consequently, no action is required.

Even though only 8 degradation levels are illustrated for table 200, the present invention may not be limited in this regard and other degradation levels may also be used or some of the degradation levels can be eliminated. For example, a network administrator may establish (and modify) a policy document (e.g., 555 in FIG. 5) using an administrative portal (e.g., 560). The policy document (555) may specify various policies for the VARS 126, including degradation levels for table 200.

Figure 3:
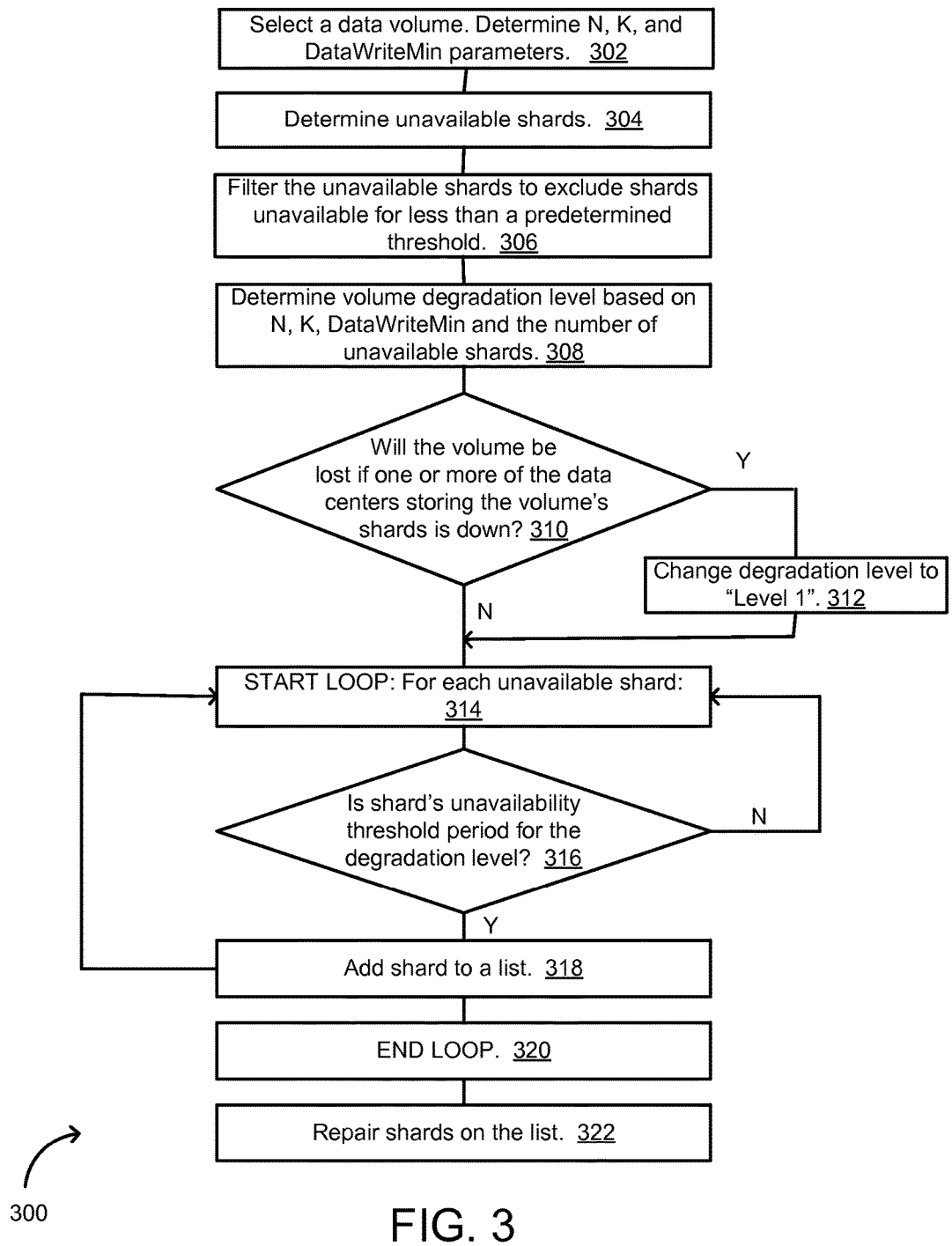
FIG. 3 is a flow diagram illustrating example steps used for data volume auto-repair, in accordance with an example embodiment of the disclosure.

FIG. 3 is a flow diagram illustrating example steps used for data volume auto-repair, in accordance with an example embodiment of the disclosure. Referring to FIGS. 1 and 3, the example method 300 may start at 302, when a data volume may be selected. For example, the VARS 126 may select data volume 132, and determine the N, K and DataWriteMin parameters for the volume 132 (e.g., the parameters may be stored in table 200 or in the volume metadata 130). At 304, the VARS 126 may determine the unavailable shards for the volume 132. For example, VARS 126 may receive heartbeat information (HI) 138 from the heartbeat monitors (HMs) 142 for the servers storing the 9 shards of volume 132. Shards 6 and 9 may be determined as unavailable. At 306, the VARS 126 may filter the unavailable shards to exclude shards that have been unavailable for less than a predetermined threshold (exclude shards that have been unavailable for less than the SHARD_DOWN_TRANSIENT_THRESHOLD, as explained herein below). Both shards 6 and 9 may be considered to be unavailable for more than 1 hour (i.e., the example SHARD_DOWN_TRANSIENT_THRESHOLD).

At 308, the VARS 126 may determine the volume degradation level based on the table 200. For example, volume 132 may have N=9 and K=5. With 2 shards down (i.e., N−K−2 shards are down), the degradation level may be selected as level 3. At 310, it may be determined whether volume 132 will be lost (i.e., unrecoverable) if one or more of the data centers (120-124) becomes unavailable. For example, the shards can be grouped based on geographic location to determine a hypothetical impact of a data center loss. Thus, each shard can have location information associated with it, in order to implement the grouping. In the specific example illustrated in FIG. 1, with shards 6 and 9 down, if data center 120 becomes unavailable, then only 4 shards will be available and volume 132 will be unrecoverable. Therefore, at 312, the degradation level may be changed to level 1. At 314, a processing loop may be initiated for each unavailable shard (i.e., shards 6 and 9). At 316, it may be determined whether the unavailable shards have been unavailable for at least the threshold period listed in table 200. If yes, then at 318, the shard may be added to the unavailable shards list 128. In the example illustrated in FIG. 1, both shards 6 and 9 have been unavailable for more than an hour (i.e., they satisfy both SHARD_DOWN_TRANSIENT_THRESHOLD as well as the threshold period listed in table 200 for degradation level 1). The processing loop may end at 320.

At 322, the VARS 126 may automatically initiate repair of the unavailable shards (6 and 9) listed in list 128. For example, the VARS 126 may issue a repair instruction 140 to the data centers 122 and 124. The unavailable shards 6 and 9 may be reconstructed from the remaining available shards, and the newly reconstructed shards 6 and 9 may be stored in new servers. For example, a newly reconstructed shard 6 may be stored in server 113 in data center 122, and newly reconstructed shard 9 may be stored in server 119 in data center 124. Updated shard metadata information 136 may be communicated from the VARS 126 to the volume metadata block 130, for updating the metadata information associated with volume 132 (e.g., list the new servers 113 and 119 and/or their IP addresses as being the servers storing shards 6 and 9, respectively).

In accordance with an example embodiment of the disclosure, an additional threshold period may be used, in addition to the threshold periods listed in table 200 (the threshold periods that apply to volume degradation levels). The additional threshold can be used for determining how long a host should be detected as down, to start making auto-repair decisions as a result of the host being down. The additional threshold can be used to avoid performing volume auto-repair due to transiently unavailable shards as a result of software deployments, host reboot, application restart, and so forth. The additional threshold may be referred as 'SHARD_DOWN_TRANSIENT_THRESHOLD', whose value may be selected as '1 hour' (e.g., as used in the example pseudo code below). This means that a shard has to be down (unavailable) for at least one hour (i.e., the additional threshold) before the shard is even considered unavailable based on the threshold periods listed in table 200.

The following example pseudo code describes a volume auto-repair decision logic in accordance with one embodiment:

```
/*code block for auto volume repair*/
autoRepair {
    Set<Shard>unavailableShards:=volume.getAllUnavailableShards( )
    //filter transient ones
    filterTransientlyUnavailable(unavailableShards)
    degradedLevel:=getDegradedLevel(volume, unavailableShards)
    IF (isVolumeLostAfterDcDown(volume)) THEN
    degradedLevel:=DcDownLost
    ENDIF
    //create new empty set
    Set<Shard>shardsMarkedForRepair=new Set( )
    FOR each shard in unavailableShards
    downPeriodForShard:=getDownPeriod(shard)
    IF  (isEligibleToMarkForRepair(downPeriodForShard,
        degradedLevel)) THEN
        shardsMarkedForRepair.add(shard)
    ENDIF
    END FOR
    IF (!shardsMarkedForRepair.isEmpty( )) THEN
    startRepair(volume, shardsMarkedForRepair)
    ENDIF
}
/*Return true if the given volume with the given set of
'unavailableShards' being unavailable can be lost if any of
the data centers in which the volume resides is down.
Return false, otherwise.*/
boolean    isVolumeLostAfterDcDown(Volume    volume,
Set<Shard>unavailableShards) {
    Set<DataCenter>dataCenters=volume.getDataCentersForThisVolume( )
    n:=volume.getErasureCodeN( )
    k:=volume.getErasureCode n K( )
    FOR (dc in dataCenters)
    //create new empty set
    //this set will contain all unavailable shards if this DC
        goes down
    Set<Shard>unavailableShardsAfterDcDown=new Set( )
    //get shards for volume in this DC
    shardsInDc=volume.getShardsInDC(dc)
    unavailableShardsAfterDcDown.addAll(shardsInDc)
    unavailableShardsAfterDcDown.addAll(unavailableShards)
    IF (unavailableShardsAfterDcDown.size>n-k) THEN
        RETURN TRUE
    ENDIF
    END FOR
    RETURN FALSE
}
/*get the volume degradation level for the given volume
which has the given set of shards 'unavailableShards' being
unavailable*/
Level    getDegradedLevel(Volume    volume,
Set<Shard>unavailableShards) {
    n:=volume.getErasureCodeN( )
    k:=volume.getErasureCodeK( )
    putQuorum:=volume.getPutQuorum( )
    IF(unavailableShards.size>n-k) THEN
    RETURN LOST
    ENDIF
    IF (unavailableShards.size>=n-k-1) THEN
    RETURN Critical
    ENDIF
    IF (unavailableShards.size>=n-k-2) THEN
    RETURN CriticalMinusOne
    ENDIF
    IF (unavailableShards.size>n-putQuorum) THEN
    RETURN AtRisk
    ENDIF
    IF (unavailableShards.size=n-putQuorum) THEN
    RETURN Degraded
    ENDIF
    IF (unavailableShards.size>=1) THEN
    RETURN NotPerfect
    ENDIF
    RETURN Perfect
}
//filters shards from the unavailable set that are transiently
unavailable
filterTransientlyUnavailable(Set<Shard>unavailableShards)
{
    FOR(shard in unavailableShards)
    IF   (shard.getHostDownTime(   )<SHARD_DOWN_
        TRANSIENT_THRESHOLD)
        unavailableShards.remove(shard)
    ENDIF
    END FOR
}
/*Return true, if the shard that is unavailable for 'downPeriodForShard', whose volume degradation is at 'degradedLevel' can be marked as failed by auto-repair.
Return false, otherwise*/
boolean  isEligibleToMarkForRepair(downPeriodForShard,
degradedLevel) {
    CASE degradedLevel OF
    Lost: RETURN false
    Perfect: RETURN false
    DcDownLost:
        IF    (downPeriodForShard>AUTO_REPAIR_
        DCDOWN_THRESHOLD) THEN
        RETURN true
        ENDIF
```

Critical:
    IF       (downPeriodForShard>AUTO_REPAIR_CRITICAL_THRESHOLD) THEN
    RETURN true
    ENDIF
CriticalMinusOne:
    IF       (downPeriodForShard>AUTO_REPAIR_CRITICAL_MINUS_ONE_THRESHOLD) THEN
    RETURN true
    ENDIF
AtRisk:
    IF(downPeriodForShard>AUTO_REPAIR_AT_RISK_THRESHOLD) THEN
    RETURN true
    ENDIF
Degraded:
    IF       (downPeriodForShard>AUTO_REPAIR_DEGRADED_THRESHOLD) THEN
    RETURN true
    ENDIF
NotPerfect:
    IF       (downPeriodForShard>AUTO_REPAIR_NOT_PERFECT_THRESHOLD) THEN
    RETURN true
    ENDIF
OTHERS:
    RETURN false
ENDCASE
}

FIG. 4 is an example system diagram showing a plurality of virtual machine instances running in a multi-tenant environment, using a volume auto-repair service, in accordance with an example embodiment of the disclosure. More specifically, FIG. 4 is a computing system diagram of a network-based service provider 400 that illustrates one environment in which embodiments described herein can be used. By way of background, the service provider 400 (i.e., the cloud provider) is capable of delivery of, e.g., computing and/or storage capacity as a service to a community of end recipients (e.g., tenants or customers).

In an example embodiment, the service provider 400 can be established for an organization by or on behalf of the organization. That is, the service provider 400 may offer a "private cloud environment." In another embodiment, the service provider 400 supports a multi-tenant environment, wherein a plurality of customers operate independently (i.e., a public cloud environment). Generally speaking, the service provider 400 can provide the following models: Infrastructure as a Service ("IaaS"), Platform as a Service ("PaaS"), and/or Software as a Service ("SaaS"). Other models can be provided. For the IaaS model, the service provider 400 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the service provider platform without the cost of buying and managing the underlying hardware and software. The SaaS model allows installation and operation of application software in the service provider. In some embodiments, end users access the service provider 400 using networked customer devices, such as desktop computers, laptops, tablets, smartphones, etc. running web browsers or other lightweight customer applications. Those skilled in the art will recognize that the service provider 400 can be described as a "cloud" environment.

The particular illustrated service provider 400 includes a plurality of server computers 402A-402D. While only four server computers are shown, any number can be used, and large centers can include thousands of server computers. The server computers 402A-402D can provide computing resources for executing software instances 406A-406D. In one embodiment, the instances 406A-406D are virtual machines. As known in the art, a virtual machine is an instance of a software implementation of a machine (i.e., a computer) that executes applications like a physical machine. In the example, each of the server computers 402A-402D can be configured to execute a hypervisor 408 or another type of program configured to enable the execution of multiple instances 406 on a single server. For example, each of the servers 402A-402D can be configured (e.g., via the VMM/hypervisor 408) to support one or more virtual machine partitions, with each virtual machine partition capable of running a virtual machine instance (e.g., server computer 402A could be configured to support three virtual machine partitions each running a corresponding virtual machine instance). Additionally, each of the instances 406 can be configured to execute one or more applications.

Each of the server computers (e.g., 402A-402D) may comprise suitable logic, circuitry, interfaces, and/or code and may be operable to run the VMIs (e.g., instances 406A-406D) using computing resources of the server. The server computers 402A-402D may each comprise a virtual machine instance manager (or virtual machine manager, "VMM") 408, which may include code operable to run one or more VMIs on the server computers 402. In example embodiment, the VMM 408 may be a hypervisor.

In an example embodiment, each of the server computers 402A-402D may also comprise "heartbeat" monitors (HMs) 416A-416D, which may have functionalities similar to the functionalities of the HMs 142 in FIG. 1.

Figure 5:
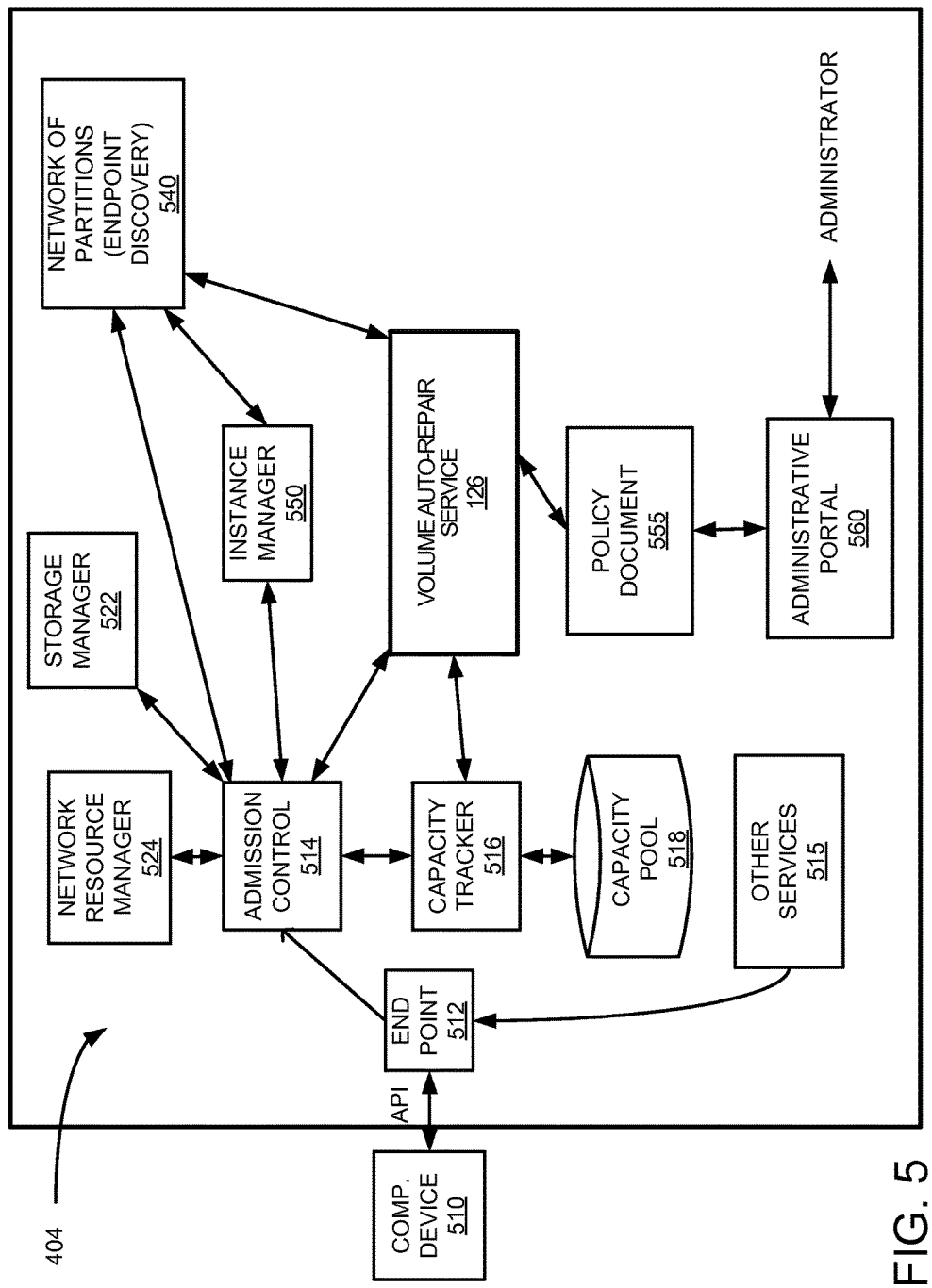
FIG. 5 shows further details of an example system including a plurality of management components associated with a control plane, which may be used for data volume auto-repair according to one embodiment.

The service provider 400 may also comprise a volume auto-repair service (VARS) 126 with functionalities as described herein. The VARS 126 may be implemented as a stand-alone service within the provider 400, as a dedicated server (similar to the servers 402A-402D), and/or may be implemented as part of the server computer 404 that performs management functions. For example, the VARS 126 may be implemented as part of the management component 410 (as seen in FIG. 5).

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 404 can be reserved for executing software components for managing the operation of the server computers 402, the instances 406, the hypervisors 408, and/or the VARS 126. For example, the server computer 404 can execute a management component 410. A customer can access the management component 410 to configure various aspects of the operation of the instances 406 purchased by the customer. For example, the customer can purchase, rent or lease instances and make changes to the configuration of the instances. The customer can also specify settings regarding how the purchased instances are to be scaled in response to demand. The management component 410 can further include a policy document (e.g., 555 in FIG. 5) to implement volume auto-repair functions as described in reference to FIG. 1.

The server computer 404 may further comprise memory 452, which may be used as processing memory by the discontinuous migration service 120. An auto scaling component 412 can scale the instances 406 based upon rules defined by the customer. In one embodiment, the auto scaling component 412 allows a customer to specify scale-up rules for use in determining when new instances should be instantiated and scale-down rules for use in determining when existing instances should be terminated. The auto scaling component 412 can consist of a number of subcomponents executing on different server computers 402 or other computing devices. The auto scaling component 412 can monitor available computing resources over an internal management network and modify resources available based on need.

A deployment component 414 can be used to assist customers in the deployment of new instances 406 of computing resources. The deployment component can have access to account information associated with the instances, such as who is the owner of the account, credit card information, country of the owner, etc. The deployment component 414 can receive a configuration from a customer that includes data describing how new instances 406 should be configured. For example, the configuration can specify one or more applications to be installed in new instances 406, provide scripts and/or other types of code to be executed for configuring new instances 406, provide cache logic specifying how an application cache should be prepared, and other types of information. The deployment component 414 can utilize the customer-provided configuration and cache logic to configure, prime, and launch new instances 406. The configuration, cache logic, and other information may be specified by a customer using the management component 410 or by providing this information directly to the deployment component 414. The instance manager (e.g., 550 in FIG. 5) can be considered part of the deployment component 414.

Customer account information 415 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, and so forth.

A network 430 can be utilized to interconnect the server computers 402A-402D and the server computer 404. The network 430 can be a local area network (LAN) and can be connected to a Wide Area Network (WAN) 440 so that end-users can access the service provider 400. It should be appreciated that the network topology illustrated in FIG. 4 has been simplified and that many more networks and networking devices can be utilized to interconnect the various computing systems disclosed herein.

FIG. 5 shows further details of an example system including a plurality of management components associated with a control plane, which may be used for data volume auto-repair according to one embodiment. More specifically, FIG. 5 illustrates in further detail the management plane of the server computer 404, which may implement the instance migration service 132 within the multi-tenant environment of the service provider 400.

In order to access and utilize instances (such as instances 406 of FIG. 4), a customer device can be used. The customer device 510 can be any of a variety of computing devices, mobile or otherwise, including a cell phone, smartphone, handheld computer, Personal Digital Assistant (PDA), desktop computer, etc. The customer device 510 can communicate with the service provider 400 through an end point 512, which can be a DNS address designed to receive and process application programming interface (API) requests. In particular, the end point 512 can be a web server configured to expose an API. Using the API requests, a customer device 510 can make requests to implement any of the functionality described herein (e.g., request a reboot to initiate an instance migration). Other services 515, which can be internal to the service provider 400, can likewise make API requests to the end point 512. For example, the customer device 510 may use the API requests to communicate a customer request (or a network administrator request) associated with volume auto-repair. An administrative portal 560 can be used to access and make changes to the policy document 555 by an administrator of either the customer or the service provider 400. The policy document (555) may specify various policies for the VARS 126, including degradation levels, timing parameters, thresholds, etc.

Other general management services that may or may not be included in the service provider 400 (and/or within the management component 410) include an admission control 514, e.g., one or more computers operating together as an admission control web service. The admission control 514 can authenticate, validate and unpack the API requests for service or storage of data within the service provider 400. The capacity tracker 516 is responsible for determining how the servers need to be configured in order to meet the need for the different instance types by managing and configuring physical inventory in terms of forecasting, provisioning, and real-time configuration and allocation of capacity. The capacity tracker 516 maintains a pool of available inventory in a capacity pool database 518. The capacity tracker 516 can also monitor capacity levels so as to know whether resources are readily available or limited.

An instance manager 550 controls launching and termination of virtual machine instances in the network. When an instruction is received (such as through an API request) to launch an instance, the instance manager 550 pulls resources from the capacity pool 518 and launches the instance on a decided upon host server computer. Similar to the instance manager are the storage manager 522 and the network resource manager 524. The storage manager 522 relates to initiation and termination of storage volumes, while the network resource manager 524 relates to initiation and termination of routers, switches, subnets, etc. A network of partitions 540 is described further in relation to FIG. 6 (e.g., 640), and includes a physical layer upon which the instances are launched.

The volume auto-repair service 126 may perform the volume repair functionalities described herein. The VARS 126 may communicate with the capacity tracker 516 to receive information regarding available partitions and/or host servers that can be used for volume repair and launching of replacement shards on new server computers (or other volume repair functionalities requested by a customer entity and/or a network administrator). Additionally, communications with the admission control 514 may be used to detect volume repair requests and communicate notifications to the customer or the network administrator, and communications with the network of partitions 540 may be used to perform volume repair functionalities affecting a plurality of partitions. Heartbeat information can be received by the VARS from the network of partitions 540 in order to determine if a shard is unavailable.

Figure 6:
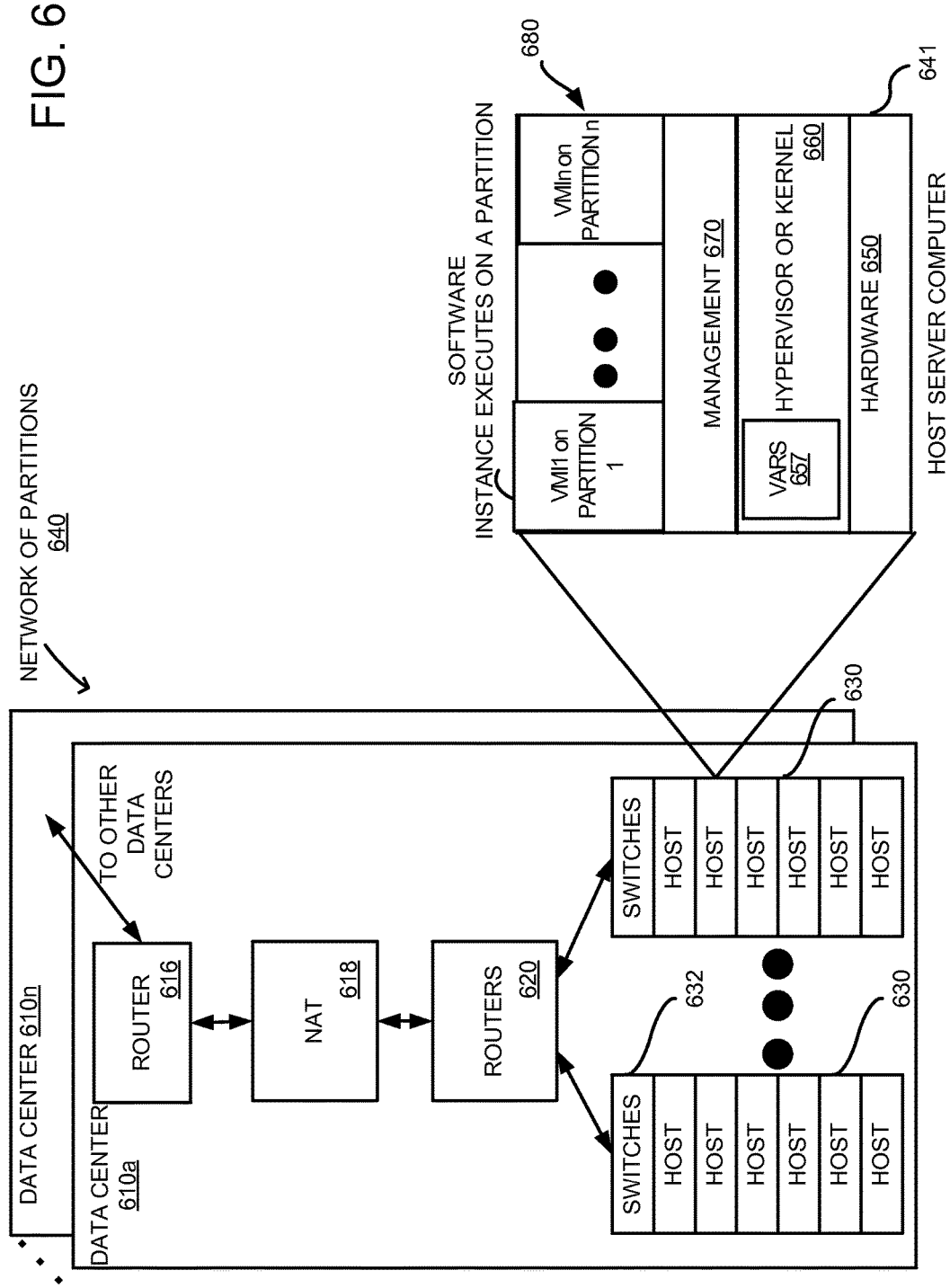
FIG. 6 shows an example of a plurality of host computers, routers, and switches—which are hardware assets used for running virtual machine instances—with the host computers having volume auto-repair functionalities that may be configured according to one embodiment.

FIG. 6 shows an example of a plurality of host computers, routers, and switches—which are hardware assets used for running virtual machine instances—with the host computers having volume auto-repair functionalities that may be configured according to one embodiment. More specifically, FIG. 6 illustrates the network of partitions 640 and the physical hardware associated therewith. The network of partitions 640 can include a plurality of data centers, such as data centers 610*a*, ... , 610*n*, coupled together by routers, such as router 616.

The router 616 reads address information in a received packet and determines the packet's destination. If the router decides that a different data center contains a host server computer, then the packet is forwarded to that data center. If the packet is addressed to a host in the data center 610*a*, then it is passed to a network address translator (NAT) 618 that converts the packet's public IP address to a private IP address. The NAT 618 also translates private addresses to public addresses that are bound outside of the data center 610*a*. Additional routers 620 can be coupled to the NAT 618 to route packets to one or more racks 630 of host server computers. Each rack 630 can include a switch 632 coupled to multiple host server computers. A particular host server computer is shown in an expanded view at 641.

Each host 641 has underlying hardware 650, which may include a network interface card, one or more CPUs, memory, and so forth (not illustrated in FIG. 6). Running a layer above the hardware 650 is a hypervisor or kernel layer 660. The hypervisor or kernel layer 660 can be classified as a type 1 or type 2 hypervisor. A type 1 hypervisor runs directly on the host hardware 650 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can also be used.

A management layer 670 can be part of the hypervisor or separated therefrom, and generally includes device drivers needed for accessing the hardware 650. The partitions 680 are logical units of isolation by the hypervisor. Each partition 680 can be allocated its own portion of the hardware layer's memory, CPU allocation, storage, etc. Additionally, each partition can include a virtual machine and its own guest operating system (e.g., VMl1 may be running on partition 1 and VMln may be running on partition n). As such, each partition 680 is an abstract portion of capacity designed to support its own virtual machine independent of the other partitions.

In accordance with an example embodiment of the disclosure, volume auto-repair service 657 may be part of the hypervisor 660 and may be used to implement VARS functionalities as described herein. The auto-repair service 657 may include the functionalities associated with, for example, the VARS 126.

Figure 7:
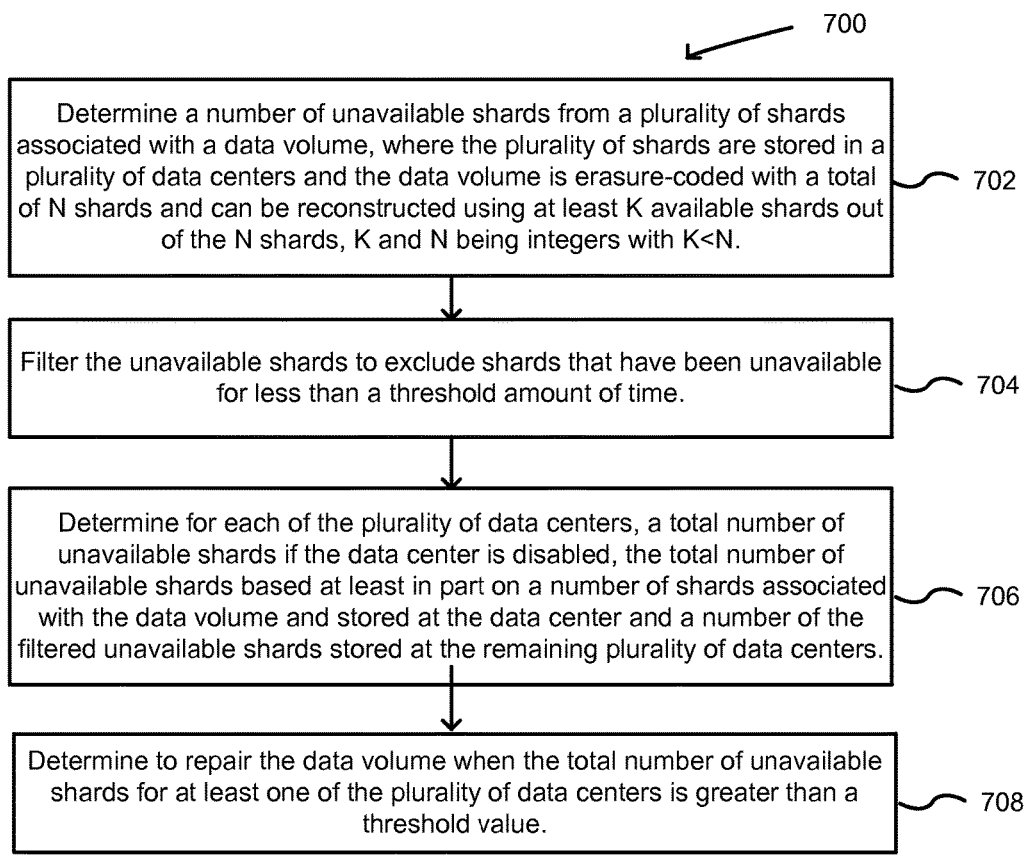
FIGS. 7-9 are flowchart of example methods for performing auto-repair of a data volume based on volume degradation level, in accordance with various embodiments of the disclosure.
Figure 8:
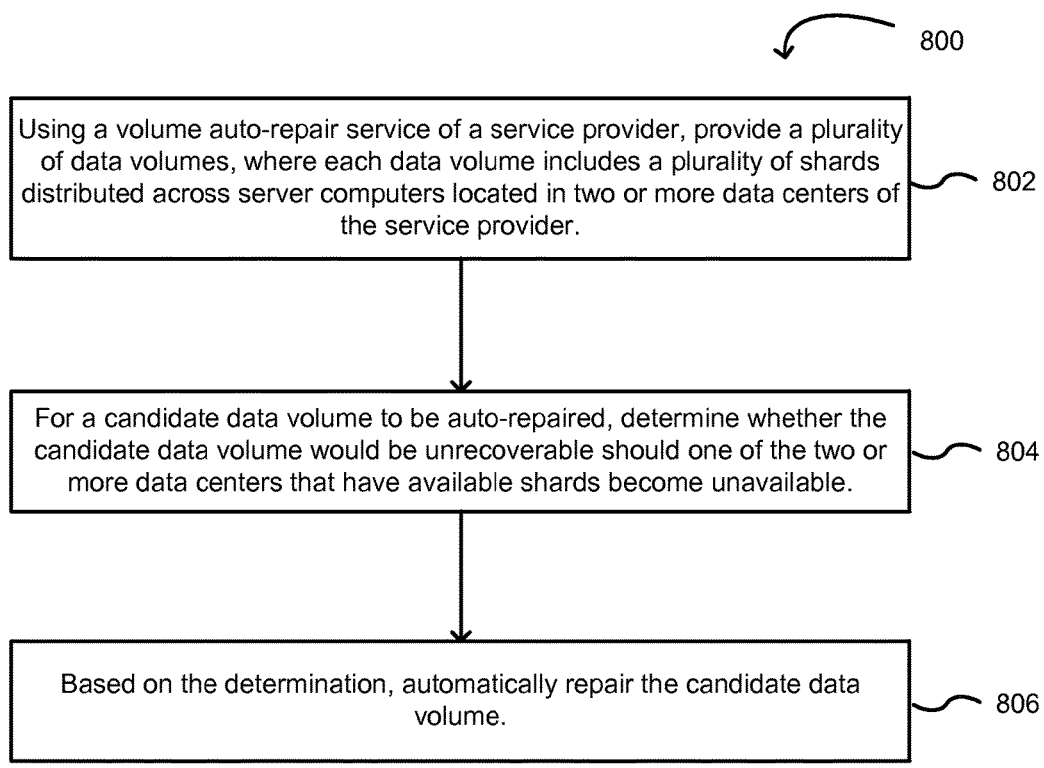
Figure 9:
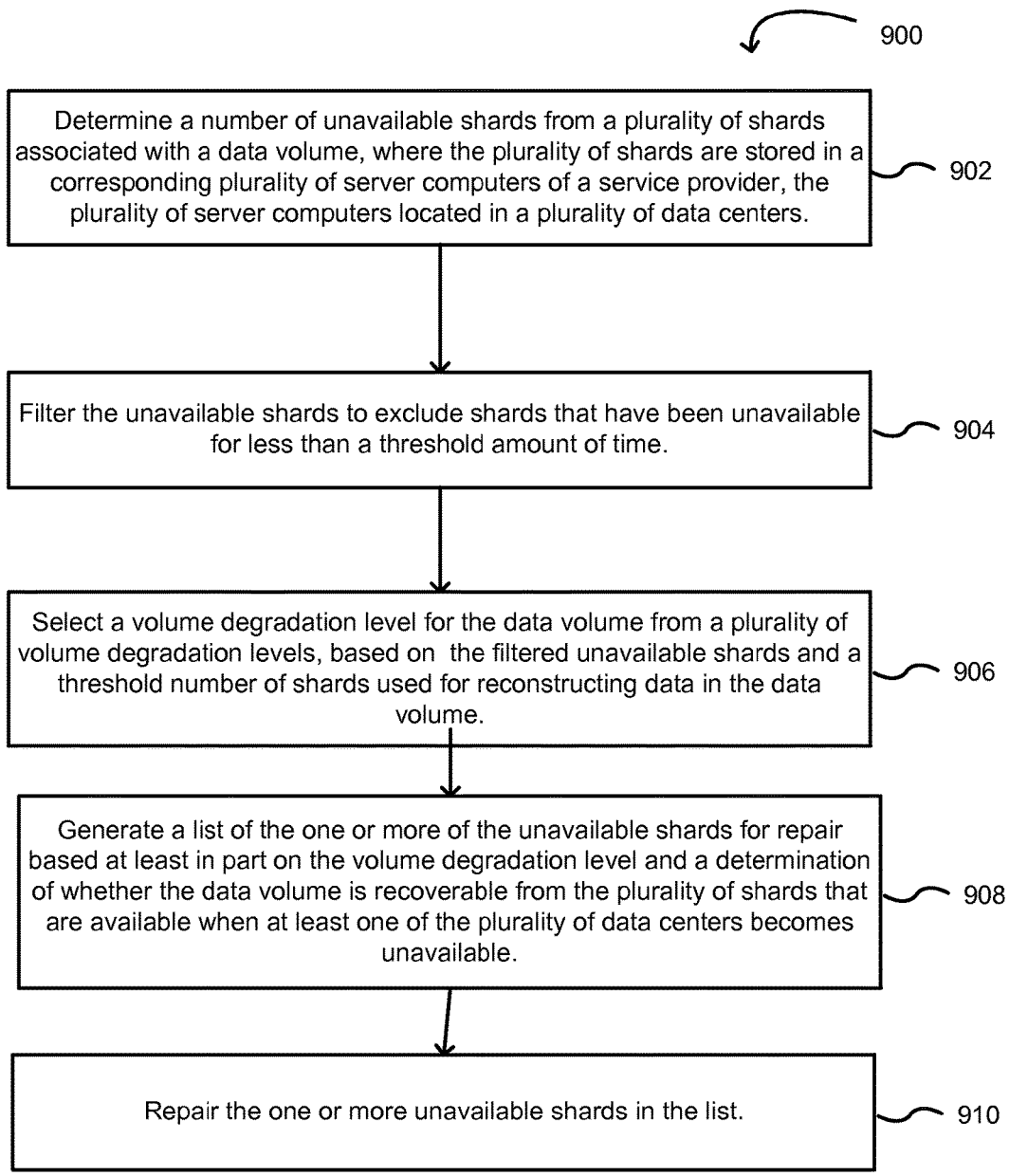

FIGS. 7-9 are flowchart of example methods for performing auto-repair of a data volume based on volume degradation level, in accordance with an embodiment of the disclosure. Referring to FIGS. 1-2 and 7, the example method 700 may start at 702, when a number of unavailable shards may be determined from a plurality of shards associated with a data volume. For example, shards 1-9 are associated with volume 132 and are stored in data centers 120-124. Additionally, the data volume 132 may be erasure-coded with a total of N shards and can be reconstructed using at least K available shards out of the N shards, K and N being integers with K<N. In the examples discussed in reference to FIGS. 1-3, N=9 (shards 1-9) and K=5 (i.e., at least 5 shards are needed to reconstruct (or repair) any unavailable shards).

At 704, the VARS 126 may filter the unavailable shards to exclude shards that have been unavailable for less than a threshold amount of time. For example, initial filtering of unavailable shards may be performed using the SHARD_DOWN_TRANSIENT_THRESHOLD, as explained above in reference to FIG. 1. At 706, the VARS 126 may determine for each of the plurality of data centers, a total number of unavailable shards if the data center is disabled. For example and in reference to FIG. 1, volume 132 may have shards 6 and 9 unavailable (i.e., 2 of the 9 shards for the volume are unavailable). However, assuming data center 120 goes down, shards 1-3 will also become unavailable, bringing the total number of unavailable shards to 5 (and available shards to 4). Since K=5, the volume will be unrecoverable using the available 4 shards. In this regard, the total number of unavailable shards can be based at least in part on a number of shards associated with the data volume and stored at the data center (i.e., these shards will be assumed unavailable if the data center becomes unavailable), and a number of the filtered unavailable shards stored at the remaining plurality of data centers (these are the currently unavailable shards located at other data centers). At 708, the VARS 126 may determine to repair the data volume when the total number of unavailable shards for at least one of the plurality of data centers is greater than a threshold value. For example, the list of unavailable shards 128 may be generated using the volume degradation table 200 (as described herein above). The VARS 126 may then proceed to auto-repair the shards on the list 128 by recovering the unavailable shards and storing them on other (new) servers.

Referring to FIGS. 1, 2, and 8, the example method 800 may start at 802, when a plurality of data volumes may be provided using a volume auto-repair service of a service provider. For example, data volumes 132, ... , 134 may be provided within the service provider environment 100 using the volume auto-repair service (VARS) 126. Each data volume includes a plurality of shards distributed across server computers located in two or more data centers of the service provider. For example, volume 132 includes shards 1-9, which are distributed among data centers 120-124 (as seen in the volume metadata block 130). Similarly, data volume 134 may include shards A1, ... , Ax distributed among servers B1, ... , By within data centers C1, ... , Cz. At 804, it may be determined for a candidate data volume to be auto-repaired, whether the candidate data volume would be unrecoverable should one of the two or more data centers that have available shards become unavailable. For example, the candidate data volume may be volume 132 with shards 1-9. It may be determined that volume 132 has shards 6 and 9 unavailable (i.e., 2 of the 9 shards for the volume are unavailable). However, assuming data center 120 goes down, shards 1-3 will also become unavailable, bringing the total number of unavailable shards to 5 (and available shards to 4). Since K=5, the volume will be unrecoverable using the available 4 shards. Therefore, at 806, the VARS 126 may automatically repair the candidate data volume based on the determination. More specifically, the VARS may repair the unavailable shards 6 and 9 as the entire volume may be unrepairable if data center 120 becomes unavailable. Shards 6 and 9 may be reconstructed from the remaining shards 1-5 and 7-8, and may be stored in new servers 113 and 119, respectively.

Referring to FIGS. 1-2 and 9, the example method 900 may start at 902, when a number of unavailable shards may be determined from a plurality of shards associated with a data volume. For example, data volumes 132, . . . , 134 may be provided within the service provider environment 100 using the volume auto-repair service (VARS) 126. Each data volume includes a plurality of shards distributed across server computers located in two or more data centers of the service provider. At 904, the VARS 126 may filter the unavailable shards to exclude shards that have been unavailable for less than a threshold amount of time. For example, initial filtering of unavailable shards may be performed using the SHARD_DOWN_TRANSIENT_THRESHOLD, as explained above in reference to FIG. 1. At 906, a volume degradation level may be selected for the data volume from a plurality of volume degradation levels. For example and as explained in reference to FIG. 2, a candidate data volume (e.g., 132) may be characterized with parameters such as N (total number of shards), K (minimum number of shards required for repairing/reconstructing shards), and DataWriteMin (a minimum number of shards to be available for successful data writing into a volume). Once these parameters are obtained (e.g., from the volume metadata 130), the volume degradation level may be determined based on the table 200 and using the number of unavailable shards, N, K, and DataWriteMin parameters. At 908, the VARS 126 may generate a list 128 of the one or more of the unavailable shards for repair (e.g., shards 6 and 9 are unavailable) based at least on the determined volume degradation level, and a determination of whether the data volume is recoverable from the plurality of shards that are available when at least one of the plurality of data centers (e.g., 120) becomes unavailable. At 910, the VARS 126 may repair the one or more unavailable shards in the list. For example, the unavailable shards 6 and 9 may be reconstructed from the remaining shards 1-5 and 7-8, and may be stored in new servers 113 and 119, respectively.

Figure 10:
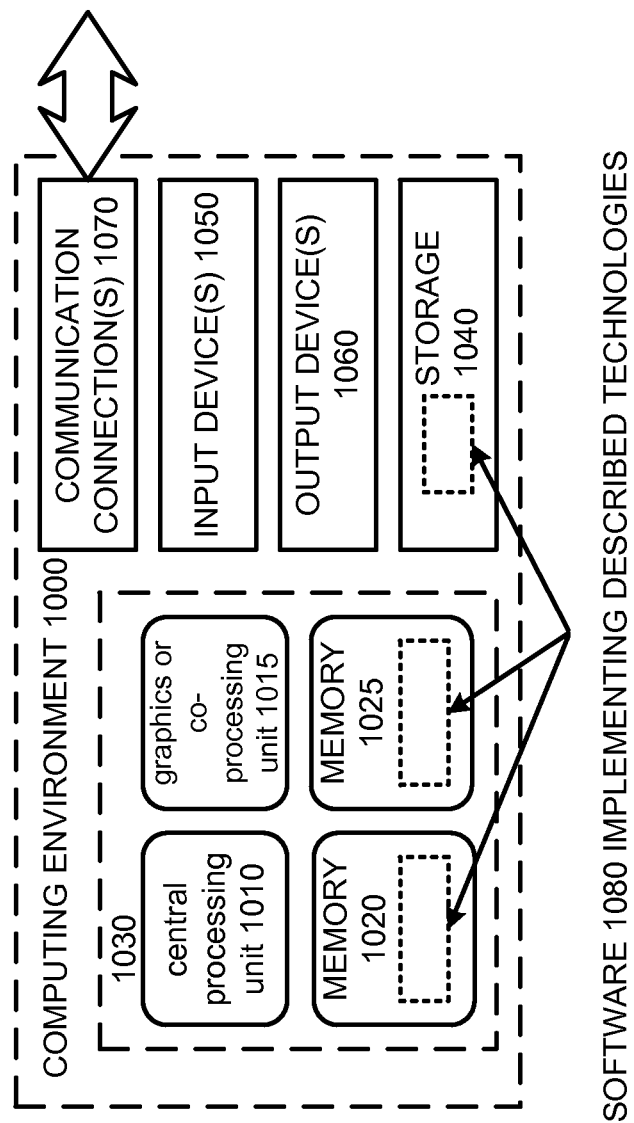
FIG. 10 depicts a generalized example of a suitable computing environment in which the described innovations may be implemented.

FIG. 10 depicts a generalized example of a suitable computing environment in which the described innovations may be implemented. Referring to FIG. 10, the computing environment 1000 is not intended to suggest any limitation as to scope of use or functionality, as the innovations may be implemented in diverse general-purpose or special-purpose computing systems. For example, the computing environment 1000 can be any of a variety of computing devices (e.g., desktop computer, laptop computer, server computer, tablet computer, etc.)

With reference to FIG. 10, the computing environment 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations (e.g., functionalities) described herein, in the form of computer-executable instructions suitable for execution by the processing unit(s).

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing environment 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing environment 1000. The output device (s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a customer-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. Therefore, what is claimed as the invention is all that comes within the scope of these claims.

What is claimed is:

1. A non-transitory computer-readable storage medium including instructions that upon execution cause a computer system to:
   determine a number of unavailable shards from a plurality of shards associated with a data volume, wherein:
   the plurality of shards are stored in a plurality of data centers; and
   the data volume is erasure-coded with a total of N shards and can be reconstructed using at least K available shards out of the N shards, K and N being integers with K<N;
   filter the unavailable shards to exclude shards that have been unavailable for less than a threshold amount of time;
   determine for each of the plurality of data centers, a total number of unavailable shards if the data center is disabled, the total number of unavailable shards based at least in part on:
      a number of shards associated with the data volume and stored at the data center; and
      a number of the filtered unavailable shards stored at the remaining plurality of data centers; and
   determine to repair the data volume when the total number of unavailable shards for at least one of the plurality of data centers is greater than a threshold value.

2. The computer-readable storage medium according to claim 1, wherein the threshold value is based on a difference of (N−K).

3. The computer-readable storage medium according to claim 1, wherein the total number of unavailable shards equals the number of shards associated with the data volume and stored at the data center plus the number of the filtered unavailable shards stored at the remaining plurality of data centers.

4. The computer-readable storage medium according to claim 1, wherein the plurality of shards are stored in a corresponding plurality of server computers.

5. The computer-readable storage medium according to claim 1, further including:
   upon determining to repair the data volume, recreating the unavailable shards using the remaining plurality of shards within the data volume.

6. The computer-readable storage medium according to claim 5, further including:
   storing the recreated shards on one or more additional server computers; and
   updating metadata associated with the data volume to reflect the location of the recreated shards on the one or more additional server computers.

7. A method for performing auto-repair of a data volume based on volume degradation level, the method comprising:
   using a volume auto-repair service of a service provider:
      providing a plurality of data volumes, wherein each data volume includes a plurality of shards distributed across server computers located in two or more data centers of the service provider;
      for a candidate data volume to be auto-repaired, determining whether the candidate data volume would be unrecoverable should one of the two or more data centers that have available shards become unavailable following a predetermined threshold time period of unavailability;
      determining a number of unavailable shards from the plurality of shards associated with the candidate data volume;
      filtering the unavailable shards to exclude shards that have been unavailable for less than a predetermined period of time; and
      automatically repairing the candidate data volume based on the determination.

8. The method according to claim 7, comprising:
automatically repairing the candidate data volume if it is determined the candidate data volume would be unrecoverable should one of the two or more data centers become unavailable.

9. The method according to claim 7, comprising:
selecting a volume degradation level for the candidate data volume from a plurality of volume degradation levels, based on the determined number of unavailable shards and a threshold number of shards used for reconstructing data in the candidate data volume.

10. The method according to claim 9, comprising:
generating a list of the one or more of the unavailable shards for repair based at least in part on:
the volume degradation level; and
the determination of whether the candidate data volume would be unrecoverable should one of the two or more data centers that have available shards become unavailable.

11. The method according to claim 10, comprising:
for each of the unavailable shards, determining whether to include the shard in the list based on a comparison of unavailability time for the shard and a threshold time period associated with the selected volume degradation level.

12. The method according to claim 10, comprising:
determining a repair criticality parameter based on average server down time for one or more of the server computers storing the one or more unavailable shards in the list.

13. The method according to claim 12, comprising:
selecting an order of repairing the one or more unavailable shards in the list based on minimizing the criticality parameter.

14. The method according to claim 7, wherein repairing the candidate data volume comprises:
recreating unavailable shards of the candidate data volume using one or more remaining shards of the data volume;
storing the recreated shards on one or more additional server computers; and
updating metadata associated with the candidate data volume to reflect the location of the recreated shards on the one or more additional server computers.

15. The method according to claim 7, wherein:
the candidate data volume is erasure-coded with a total of N shards and can be reconstructed using at least K available shards out of the N shards, K and N being integers with K<N.

16. A system for performing auto-repair comprising a data volume stored on at least one non-transitory computer-readable storage medium, the system based on a volume degradation level in a service provider environment, the system further comprising:
a plurality of server computers coupled together through a network to form the service provider environment, at least a portion of the server computers for executing a plurality of virtual machine instances (VMIs) associated with a customer account; and
a volume auto-repair service executing on one or more of the plurality of server computers, the volume auto-repair service operable to:
determine a number of unavailable shards from a plurality of shards associated with a data volume, wherein the plurality of shards are stored in a corresponding plurality of server computers of a service provider, the plurality of server computers located in a plurality of data centers;
filter the unavailable shards to exclude shards that have been unavailable for less than a threshold amount of time;
select a volume degradation level for the data volume from a plurality of volume degradation levels, based on the filtered unavailable shards and a threshold number of shards used for reconstructing data in the data volume;
generate a list of the one or more of the unavailable shards for repair based at least in part on:
the volume degradation level; and
a determination of whether the data volume is recoverable from the plurality of shards that are available when at least one of the plurality of data centers becomes unavailable; and
repair the one or more unavailable shards in the list.

17. The system according to claim 16, wherein the volume auto-repair service is further operable to:
determine a threshold time period of shard unavailability associated with the selected volume degradation level.

18. The system according to claim 17, wherein the volume auto-repair service is further operable to:
for each of the filtered unavailable shards, determining whether to include the shard in the list based on a comparison of unavailability time for the shard and the determined threshold time period associated with the selected volume degradation level.

* * * * *